United States Patent
Minami et al.

(10) Patent No.: US 9,611,563 B2
(45) Date of Patent: Apr. 4, 2017

(54) PLATING METHOD AND PLATING APPARATUS

(71) Applicant: EBARA CORPORATION, Tokyo (JP)

(72) Inventors: Yoshio Minami, Tokyo (JP); Jumpei Fujikata, Tokyo (JP); Takashi Kishi, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 15/096,972

(22) Filed: Apr. 12, 2016

(65) Prior Publication Data

US 2016/0222540 A1 Aug. 4, 2016

Related U.S. Application Data

(62) Division of application No. 13/849,178, filed on Mar. 22, 2013, now Pat. No. 9,340,891.

(30) Foreign Application Priority Data

Mar. 27, 2012 (JP) .................. 2012-071546

(51) Int. Cl.
*C25D 17/00* (2006.01)
*C25D 17/06* (2006.01)
*C25D 21/12* (2006.01)

(52) U.S. Cl.
CPC .......... *C25D 17/06* (2013.01); *C25D 17/001* (2013.01); *C25D 17/004* (2013.01); *C25D 21/12* (2013.01)

(58) Field of Classification Search
CPC .................................................. C25D 17/004
See application file for complete search history.

(56) References Cited

U.S. PATENT DOCUMENTS

| 6,544,585 | B1 | 4/2003 | Kuriyama et al. | |
| 7,445,697 | B2 * | 11/2008 | Keigler | C25D 21/12 118/500 |
| 8,038,856 | B2 * | 10/2011 | Keigler | C25D 21/12 118/500 |
| 8,425,687 | B2 * | 4/2013 | Keigler | C25D 5/003 134/137 |

(Continued)

FOREIGN PATENT DOCUMENTS

| JP | 02-122234 A | 5/1990 |
| JP | 2001-221707 A | 8/2001 |

(Continued)

*Primary Examiner* — Paul West
*Assistant Examiner* — Mark A Shabman
(74) *Attorney, Agent, or Firm* — Baker & Hostetler LLP

(57) ABSTRACT

A plating method includes holding a substrate with a substrate holder while bringing a sealing member into pressure contact with a peripheral portion of the substrate to form an enclosed internal space in the substrate holder; performing a first-stage leakage test of the substrate holder by producing a vacuum in the internal space and checking whether pressure in the internal space reaches a predetermined vacuum pressure within a certain period of time; and if the substrate holder has passed the first-stage leakage test, performing a second-stage leakage test of the substrate holder by closing off the internal space after producing the vacuum therein and checking whether a change in the pressure in the internal space reaches a predetermined value within a certain period of time.

7 Claims, 9 Drawing Sheets

(56) References Cited

U.S. PATENT DOCUMENTS

| | | | |
|---|---|---|---|
| 2002/0144900 A1* | 10/2002 | Keigler | ............... C25D 17/06 204/297.05 |
| 2005/0089645 A1* | 4/2005 | Keigler | ............... C25D 21/12 427/443.1 |
| 2007/0069383 A1 | 3/2007 | Suzuki et al. | |

FOREIGN PATENT DOCUMENTS

| | | | |
|---|---|---|---|
| JP | 2003-021570 | A | 1/2003 |
| JP | 2003-254855 | A | 9/2003 |
| JP | 2003-277995 | A | 10/2003 |
| JP | 2004-052059 | A | 2/2004 |
| JP | 2004-076022 | A | 3/2004 |
| JP | 2007-509241 | A | 4/2007 |
| JP | 2008-190044 | A | 8/2008 |
| WO | WO 00/33356 | A2 | 6/2000 |
| WO | WO 2005/042804 | A2 | 5/2005 |

\* cited by examiner

PLATING METHOD AND PLATING APPARATUS

CROSS REFERENCE TO RELATED APPLICATION

This document is a Divisional application of U.S. application Ser. No. 13/849,178, filed on Mar. 22, 2013, which claims priority to Japanese Patent Application No. 2012-071546, filed Mar. 27, 2012, the entire contents of which are hereby incorporated by reference.

BACKGROUND OF THE INVENTION

Field of the Invention

The present invention relates to a plating method and a plating apparatus for plating a surface of a substrate, and more particularly to a plating method and a plating apparatus for forming a plating film in fine interconnect trenches, holes, or resist openings provided on a surface of a substrate, such as a semiconductor wafer, or for forming bumps (extruding electrodes), to be electrically connected to electrodes of a package, on a surface of a semiconductor wafer. A plating method and a plating apparatus according to the present invention can also be used for filling via holes with metal in manufacturing of an interposer or spacer, having a large number of via plugs penetrating through it, which is to be used in three-dimensional packaging of semiconductor chips.

Description of the Related Art

It is a common practice in TAB (tape automated bonding) or flip chip to form protruding connection electrodes (bumps) of gold, copper, solder or nickel, or of multiple layers of such metals at predetermined portions (electrodes) of a surface of a semiconductor chip, having interconnects formed therein, so that the semiconductor chip can be electrically coupled via the bumps to electrodes of a package or TAB electrodes. There are various methods usable for formation of bumps, such as electroplating, vapor deposition, printing, and ball bumping. In particular, electroplating, which can form fine bumps and can be performed in a relatively stable manner, is widely used as the number of I/O in a semiconductor chip increases and the electrode pitch becomes smaller.

The electroplating method can be classified roughly into a jet method or cup method in which a substrate, such as a semiconductor wafer, is held in a horizontal position with a surface to be plated facing downward, and a plating solution is jetted upward onto the surface to be plated, and a dip method in which a substrate is held in a vertical position in a plating bath and a plating solution is injected upward into the plating bath while the plating solution overflows the plating bath during plating. Electroplating using the dip method has advantages of a small footprint and good release of bubbles which could adversely affect a quality of plating, and is therefore considered suitable for bump plating in which plating is performed on relatively large-sized holes and which requires a considerably long plating time.

A conventional electroplating apparatus using the dip method has a substrate holder for detachably holding a substrate, such as a semiconductor wafer, with its front surface (to-be-plated surface) exposed and a peripheral portion of the surface sealed. The electroplating apparatus is configured to perform plating of the surface of the substrate by immersing the substrate, together with the substrate holder, in a plating solution. The electroplating apparatus has the advantage of good release of bubbles.

Since the substrate holder is kept immersed in the plating solution during plating, the peripheral portion of the substrate, held by the substrate holder, must be securely sealed so that the plating solution will not intrude into a back surface (a surface opposite to the surface to be plated) and a peripheral area of the substrate where electrical contacts are in contact with the substrate. For example, the substrate holder has a pair of support members (holding members) designed to detachably hold the substrate therebetween and is provided with sealing members in one of the support members. One of the sealing members is brought into pressure contact with the other support member to seal a gap between the support members. The other sealing member is brought into pressure contact with the peripheral portion of the substrate, which is placed and held on the other support member, to seal a gap between the substrate and the support member.

In order to prevent leakage of a processing liquid (e.g., a plating solution) in such substrate holder, there has been proposed several approaches including: optimization of a shape and a fixing manner of the sealing member; regular cleaning of the sealing member (e.g., after every processing); regular replacement of the sealing member; improvement of accuracy of pre-processing (formation of a seed layer or a resist film) of a substrate; minimization of a positional error on setting of the substrate in the substrate holder; and regular readjustment of the sealing member.

However, it is fairly difficult to achieve completely sealed state because of deterioration of the sealing member or other causes. Especially when performing plating of a substrate surface to fill fine recesses, such as trenches or via holes, with a plating film, a plating solution having good permeability is typically used so that the plating solution can easily and securely enter the fine recesses. Use of such a plating solution makes it more difficult to establish the completely sealed state. It is also generally difficult to detect leakage of the plating solution into the substrate holder. Once the leakage of the plating solution occurs, the plating solution will intrude into the substrate holder and adhere to the peripheral portion and the back surface of the substrate. The plating solution attached to the substrate may be transferred to a substrate transport device and may contaminate the plating apparatus in its entirety. In addition, the leaked plating solution may corrode electrical contacts, resulting in poor feeding of electric current.

The applicant has proposed a substrate holder having at least one pair of electrical conductors, which are to be short-circuited by a leaked plating solution, in order to detect (through passage of electric current between the electrical conductors) leakage of a plating solution upon actual plating of a substrate held by the substrate holder, carried out by immersing the substrate, together with the substrate holder, in the plating solution (see Japanese Patent Laid-Open Publication No. 2004-52059). The applicant has also proposed a substrate holder which is configured to supply a pressurized gas into a space formed between a substrate, held by the substrate holder, and the substrate holder and surrounded by a sealing member, and to detect leakage of the gas from the sealing member by detecting a decrease in the pressure of the gas (see Japanese Patent Laid-Open Publication No. 2003-277995).

A pre-plating test of leakage of a plating solution has been proposed. In particular, after sealing a peripheral portion of a substrate with a sealing member, the possibility of leakage of a plating solution into a space defined by the sealing member is checked e.g. by depressurizing or pressurizing a hermetic space formed by the sealing member (see Japanese Patent Laid-Open Publication No. 2002-531702).

A pre-plating test of the integrity of sealing has been proposed. In particular, when a substrate holder holds a substrate while sealing a peripheral portion of the substrate with a sealing member, an internal space in the substrate holder, defined by the substrate, is depressurized e.g. by applying a small vacuum of about −0.05 atm to a recess in which the substrate is housed. The internal space is then closed off. If a change in the vacuum is within a predetermined level, e.g. 10%, within a certain time period, e.g. 5 seconds, then the integrity of sealing is determined to be verified (the leakage test is passed) (see Japanese Patent Laid-Open Publication No. 2007-509241).

It is generally difficult to determine the sealed state of the sealing member merely by measuring the pressure in the internal space in the substrate holder after evacuating or pressurizing the internal space. Moreover, when a trace amount of plating solution has leaked, a volume ratio of a volume of the internal space to the amount of the leaked plating solution is considerably high and, inversely, a change in the pressure in the internal space is considerably small. For example, when the volume of the internal space is 500 cc and the amount of leaked plating solution is 0.05 cc, the change in the pressure in the internal space is $1/10000$. Therefore, even a high-precision pressure sensor could fail to detect the sealed state. In particular, the leakage of the plating solution with even a trace amount is required to be securely detected either before or after plating in order to continuously and stably operate the plating apparatus.

The leakage of the plating solution in the substrate holder can cause corrosion of the electrical contacts of the substrate holder, an increase in the electrical contact resistance, and the like. Therefore, in a case of conducting a post-plating leakage test of the plating solution, a maintenance work, including cleaning of the substrate holder and replacement of parts, may be required depending on the degree of the leakage of the plating solution.

SUMMARY OF THE INVENTION

The present invention has been made in view of the above situation. It is therefore an object of the present invention to provide a plating method and a plating apparatus which can quickly and securely detect serious failure of a sealed state of a sealing member and can securely detect leakage of even a trace amount of plating solution prior to plating of a substrate.

In order to achieve the object, the present invention provides a plating method including: holding a substrate with a substrate holder while bringing a sealing member into pressure contact with a peripheral portion of the substrate to form an enclosed internal space in the substrate holder; performing a first-stage leakage test of the substrate holder by producing a vacuum in the internal space and checking whether pressure in the internal space reaches a predetermined vacuum pressure within a certain period of time; and if the substrate holder has passed the first-stage leakage test, performing a second-stage leakage test of the substrate holder by closing off the internal space after producing the vacuum therein and checking whether a change in the pressure in the internal space reaches a predetermined value within a certain period of time.

According to the plating method, leakage of a plating solution e.g., due to an apparent operational error or inadequate maintenance can be detected early and quickly by carrying out the first-stage leakage test which can be performed in a relatively short time. Further, the first-stage leakage test can reduce the burden on the second-stage leakage test. The second-stage leakage test can securely and quickly detect serious trouble with the sealing of the sealing member of the substrate holder, making it possible to take appropriate action on the sealing trouble.

In a preferred embodiment of the present invention, checking whether the change in the pressure in the internal space reaches the predetermined value within the certain period of time comprises: producing a vacuum in a leak-free master container; closing off the master container in which the vacuum is produced; measuring pressure difference between pressure in the internal space and pressure in the master container; and checking whether the pressure difference becomes equal to or larger than a predetermined value within a certain period of time.

The change in the pressure in the internal space is thus detected by measuring the difference between the pressure in the internal space and the pressure in the master container. This makes it possible to more accurately detect a very small change in the pressure in the internal space as compared to the case where the change in the pressure in the internal space is directly detected by using a pressure sensor.

In a preferred embodiment of the present invention, if the substrate holder has passed the second-stage leakage test, a third-stage leakage test is performed by forming a hermetic space between the substrate held by the substrate holder and a seal case arranged so as to cover the substrate; supplying a tracer gas into the hermetic space; evacuating air from the internal space; and checking whether the air evacuated from the internal space contains the tracer gas.

The third-stage leakage test, which may require a relatively long time and is optionally carried out for the substrate holder that has passed the second-stage leakage test, can securely detect leakage of a trace amount of plating solution which can occur in the sealing member.

In a preferred embodiment of the present invention, holding the substrate with the substrate holder comprises holding a substrate with a substrate holder while bringing a substrate-side sealing member into pressure contact with a peripheral portion of the substrate and bringing a holder-side sealing member into pressure contact with a surface of the substrate holder to form an enclosed internal space in the substrate holder, the hermetic space is divided into a substrate-side hermetic space around the substrate-side sealing member and a holder-side hermetic space around the holder-side sealing member, and the third-stage leakage test is performed on at least one of the substrate-side hermetic space and the holder-side hermetic space.

This embodiment makes it possible to detect whether one or both of the substrate-side sealing member and the holder-side sealing member will cause leakage of a plating solution, and to take appropriate action on the relevant sealing member(s). It takes a long time to carry out the third-stage leakage test individually for the holder-side hermetic space and for the substrate-side hermetic space. Therefore, when there is no need to detect which one of the holder-side sealing member and the substrate-side sealing member will cause leakage of a plating solution, the third-stage leakage test may be carried out for the single hermetic space, without dividing it into the two hermetic spaces, in order to shorten the test time.

The present invention also provides another plating method plating method including: holding a substrate with a substrate holder while bringing a sealing member into pressure contact with a peripheral portion of the substrate to form an enclosed internal space in the substrate holder; and performing a leakage test by forming a hermetic space between the substrate held by the substrate holder and a seal case arranged so as to cover the substrate, supplying a tracer gas into the hermetic space, evacuating air from the internal space, and checking whether the air evacuated from the internal space contains the tracer gas.

The leakage test may be performed periodically, or as an off-line test performed before the start or after the end of operation of the apparatus. When performing the off-line leakage test, a dummy substrate may be used instead of the substrate.

In a preferred embodiment of the present invention, the leakage test is performed in a substrate loading unit for loading and unloading the substrate into and from the substrate holder. Thus, the leakage test of the substrate holder can be performed immediately after the substrate is held by the substrate holder and immediately before the start of a plating process.

The present invention also provides a plating apparatus including: a substrate holder having a sealing member which is brought into pressure contact with a peripheral portion of the substrate to form an enclosed internal space in the substrate holder when holding the substrate, the substrate holder having an internal passage communicating with the internal space; a suction coupling coupled to a suction line extending from a vacuum source and detachably mounted to the substrate holder so as to communicate with the internal passage; a pressure sensor for checking whether pressure in the internal space reaches a predetermined vacuum pressure within a certain period of time when producing a vacuum in the internal space through the suction line; and a pressure change detection section for detecting a change in the pressure in the internal space after the vacuum is produced in the internal space and then the internal space is closed off.

In a preferred embodiment of the present invention, the pressure change detection section includes: a master container which is assured that any leakage does not occur and is coupled to the vacuum source, and a differential pressure sensor for measuring a differential pressure between the pressure in the master container and the pressure in the internal space.

In a preferred embodiment of the present invention, the plating apparatus further includes: a seal case arranged so as to cover a surface of the substrate held by the substrate holder to form a hermetic space between the seal case and the substrate holder, the substrate being housed in the hermetic space; a tracer gas introduction device for introducing a tracer gas into the hermetic space; and a tracer gas tester for detecting whether the tracer gas is contained in a gas flowing through the suction line.

In a preferred embodiment of the present invention, the sealing member is a substrate-side sealing member; the substrate holder has the substrate-side sealing member and a holder-side sealing member which are brought into pressure contact with the peripheral portion of the substrate and a surface of the substrate holder, respectively, to form the enclosed internal space in the substrate holder when holding the substrate; the seal case has a partition sealing member for dividing the hermetic space into a substrate-side hermetic space around the substrate-side sealing member and a holder-side hermetic space around the holder-side sealing member.

According to the present invention, the leakage of the plating solution in the substrate holder due to an apparent operational error or inadequate maintenance or the like can be detected early and quickly by the first-stage leakage test which can be performed in a relatively short time. The second-stage leakage test, which is performed on the substrate holder that has passed the first-stage leakage test, can securely and quickly detect serious trouble with the sealed state of the sealing member of the substrate holder, making it possible to take appropriate action on the sealing trouble. The leakage test according to the present invention thus makes it possible to infer the cause of leakage and early detect trouble with the sealing member, thereby reducing a time required for maintenance.

DETAILED DESCRIPTION OF THE PREFERRED EMBODIMENTS

Preferred embodiments of the present invention will now be described in detail with reference to the drawings.

Figure 1:
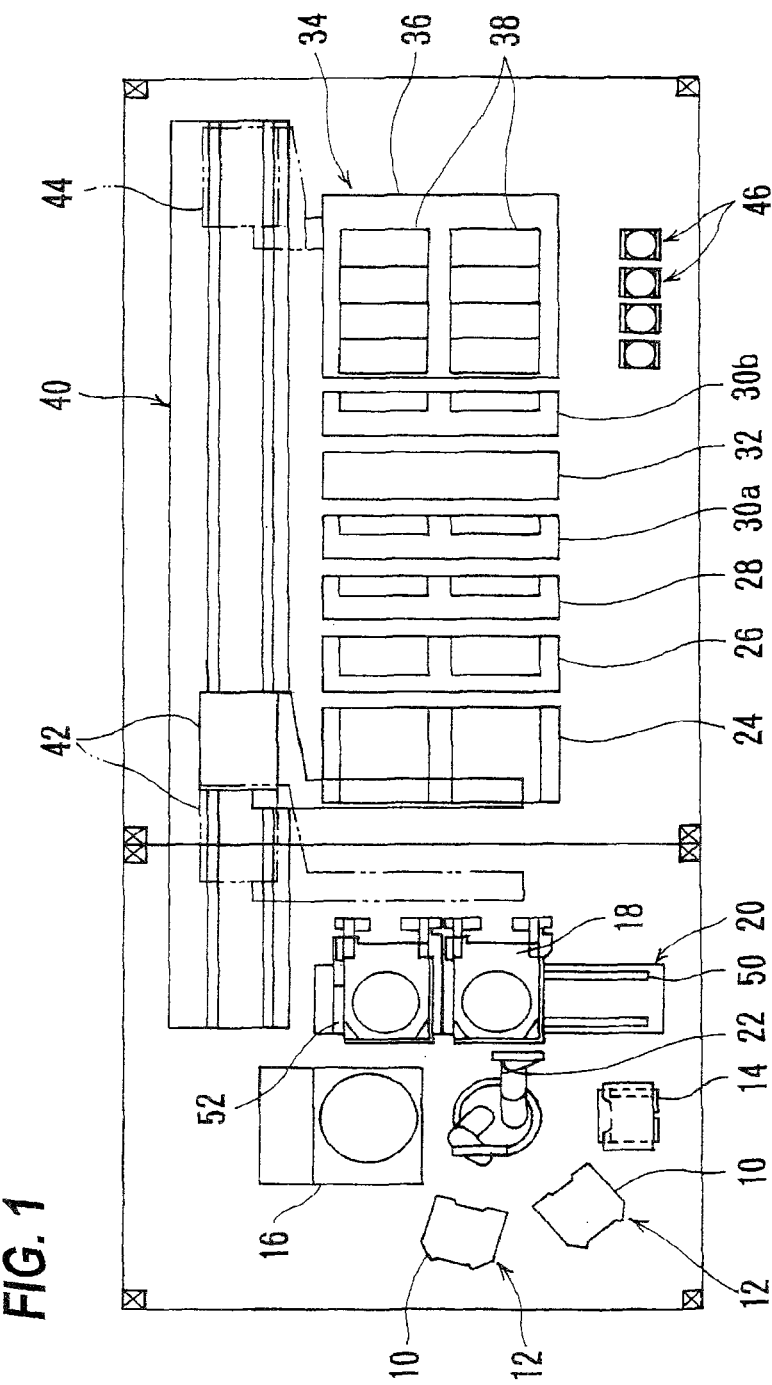
FIG. 1 is an overall layout plan view of a plating apparatus according to an embodiment of the present invention.

FIG. 1 shows an overall layout plan view of a plating apparatus according to an embodiment of the present invention. As shown in FIG. 1, the plating apparatus includes two cassette tables 12 each receives thereon a cassette 10 in which substrates W, such as semiconductor wafers, are housed, an aligner 14 for aligning an orientation flat or a notch of the substrate in a predetermined direction, and a spin rinse drier 16 for drying the substrate after plating by rotating it at a high speed. Near these units is provided a substrate loading unit 20 on which the substrate holder 18 is placed. This substrate loading unit 20 is configured to load the substrate into the substrate holder 18 and unload the substrate from the substrate holder 18. Further, in the center of these units is disposed a substrate transport device 22 which is a transport robot for transporting the substrate between these units.

The plating apparatus further includes a stock unit 24 for storing (and temporarily storing) substrate holders 18 therein, a pre-wetting bath 26 for immersing the substrate in pure water, a pre-soaking bath 28 for etching away an oxide film formed on a surface of a film (e.g., a seed layer) of the substrate, a first water-cleaning bath 30a for cleaning the surface of the pre-soaked substrate, a blow bath 32 for draining the substrate after cleaning, a plating bath 34 for plating the substrate, and a second water-cleaning bath 30b for cleaning the plated substrate. The stock unit 24, the pre-wetting bath 26, the pre-soaking bath 28, the first water-cleaning bath 30a, the blow bath 32, the second water-cleaning bath 30b, and the plating bath 34 are arranged in this order from the substrate loading unit side. The plating bath 34 includes an overflow bath 36 and a plurality of plating cells 38 housed in the overflow bath 36. Each plating cell 38 is configured to receive one substrate therein and perform plating, e.g., copper plating, on the surface of the substrate.

The plating apparatus further includes a substrate holder transport device 40, driven e.g., by a linear motor for transporting the substrate holder 18, together with the substrate, between the above-described bathes and units. This substrate holder transport device 40 is arranged beside these bathes and units. The substrate holder transport device 40 has a first transporter 42 for transporting the substrate between the substrate loading unit 20 and the stock unit 24, and a second transporter 44 for transporting the substrate between the stock unit 24, the pre-wetting bath 26, the pre-soaking bath 28, the water-cleaning bath 30a, the second water-cleaning bath 30b, the blow bath 32, and the plating bath 34. The substrate holder transport device 40 may include only the first transporter 42 without being provided with the second transporter 44.

Paddle drive devices 46 are provided each for driving a paddle (not shown) disposed in each plating cell 38 as an agitator for agitating a plating solution. The paddle drive devices 46 are located next to the overflow bath 36 at the opposite side of the substrate holder transport device 40.

The substrate loading unit 20 includes a flat stage plate 52 which is laterally slidable along rails 50. Two substrate holders 18, parallel to each other, are placed horizontally on the stage plate 52. After one substrate is transferred between one substrate holder 18 and the substrate transport device 22, the stage plate 52 is slid laterally and the other substrate is transferred between the other substrate holder 18 and the substrate transport device 22.

As shown in FIGS. 2 through 5, the substrate holder 18 includes a first holding member (base holding member) 54 having a rectangular plate shape and made of e.g., vinyl chloride, and a second holding member (movable holding member) 58 rotatably coupled to the first holding member 54 through a hinge 56 which allows the second holding member 58 to open and close with respect to the first holding member 54. Although in this embodiment the second holding member 58 is configured to be openable and closable through the hinge 56, it is also possible to dispose the second holding member 58 opposite to the first holding member 54 and to move the second holding member 58 away from and toward the first holding member 54 to thereby open and close the second holding member 58.

The second holding member 58 includes a base portion 60 and a ring-shaped seal holder 62. The seal holder 62 is made of vinyl chloride so as to enable a retaining ring 64, which will be described later, to slide well. An inwardly-projecting substrate-side sealing member 66 is fixed to an upper surface of the seal holder 62. The substrate-side sealing member 66 is placed in pressure contact with a peripheral portion of the surface of the substrate W to seal a gap between the substrate W and the second holding member 58 when the substrate W is held by the substrate holder 18. A holder-side sealing member 68 is fixed to a surface, facing the first holding member 54, of the seal holder 62. This holder-side sealing member 68 is placed in pressure contact with the first holding member 54 to seal a gap between the first holding member 54 and the second holding member 58 when the substrate W is held by the substrate holder 18. The holder-side sealing member 68 is located outwardly of the substrate-side sealing member 66.

Figure 5:
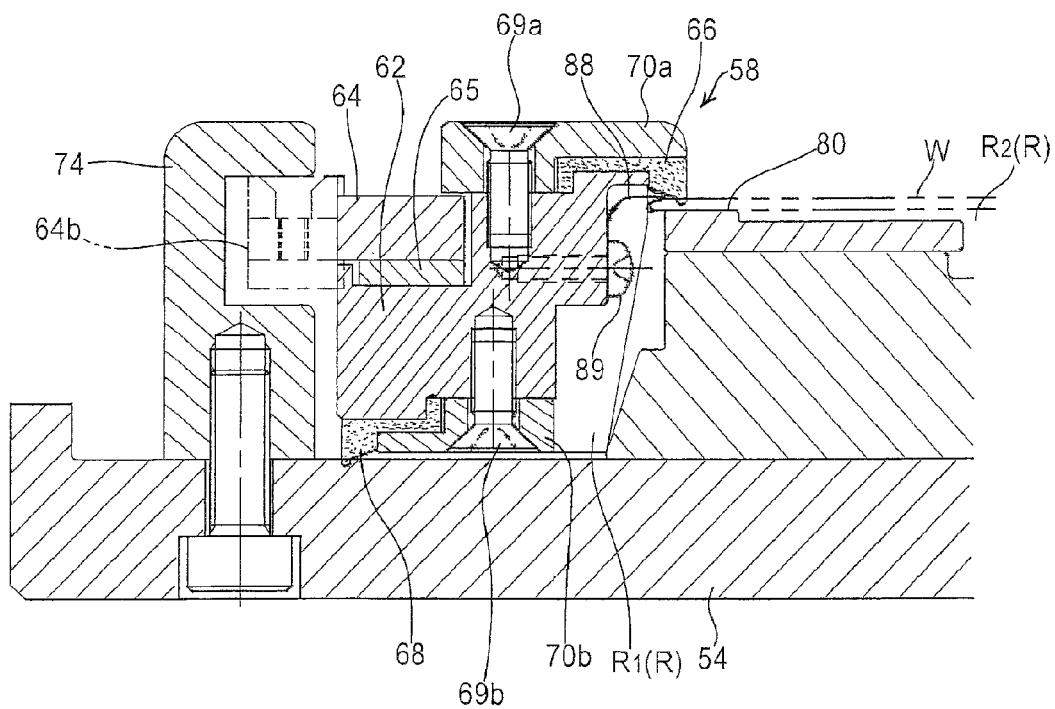
FIG. 5 is an enlarged view of a portion A of FIG. 4.

As shown in FIG. 5, the substrate-side sealing member 66 is sandwiched between the seal holder 62 and a first mounting ring 70a which is secured to the seal holder 62 by fastening tools 69a, such as bolts. The holder-side sealing member 68 is sandwiched between the seal holder 62 and a second mounting ring 70b which is secured to the seal holder 62 by fastening tools 69b, such as bolts.

The seal holder 62 of the second holding member 58 has a stepped portion at a periphery thereof, and the retaining ring 64 is rotatably mounted to the stepped portion via a spacer 65. The retaining ring 64 is inescapably held by an outwardly projecting retaining plates 72 (see FIG. 3) mounted to a side surface of the seal holder 62. This retaining ring 64 is made of a material having high rigidity and excellent acid corrosion resistance, for example titanium, and the spacer 65 is made of a material having a low friction coefficient, for example PTEF, so that the retaining ring 64 can rotate smoothly.

Inverted L-shaped clampers 74, each having an inwardly projecting portion and located outside of the retaining ring 64, are provided on the first holding member 54 at equal intervals along a circumferential direction of the retaining ring 64. Outwardly projecting portions 64b are provided on the retaining ring 64 along the circumferential direction of the retaining ring 64 at positions corresponding to positions of the clampers 74. A lower surface of the inwardly projecting portion of each clamper 74 and an upper surface of each projecting portion 64b of the retaining ring 64 are tapered in opposite directions along the rotational direction of the retaining ring 64. A plurality (e.g., three) of upwardly protruding dots 64a are provided on the retaining ring 64 in predetermined positions along the circumferential direction of the retaining ring 64. The retaining ring 64 can be rotated by pushing and moving each dot 64a from a lateral direction by means of a rotating pin (not shown).

When the second holding member 58 is open, the substrate W is inserted into the central portion of the first holding member 54, and the second holding member 58 is then closed through the hinge 56. Subsequently the retaining ring 64 is rotated clockwise so that each projecting portion 64b of the retaining ring 64 slides into the inwardly projecting portion of each clamper 74. As a result, the first holding member 54 and the second holding member 58 are fastened to each other and locked by engagement between the tapered surfaces of the projecting portions 64b of the retaining ring 64 and the tapered surfaces of the clampers 74. The lock can be released by rotating the retaining ring 64 counterclockwise to disengage the projecting portions 64b of the retaining ring 64 from the inwardly projecting portions of the clampers 74. When the second holding member 58 is locked in the above-described manner, the lower end of the inner downwardly-protruding portion of the substrate-side sealing member 66 is placed in pressure contact with the peripheral portion of the surface of the substrate W held by the substrate holder 18, while the lower end of the outer downwardly-protruding portion of the holder-side sealing member 68 is placed in pressure contact with the surface of the first holding member 54, whereby the sealing members 66 and 68 are uniformly pressed to seal the gap between the substrate W and the second holding member 58 and the gap between the first holding member 54 and the second holding member 58, respectively.

When the substrate W is held by the substrate holder 18, a holder-side internal space $R_1$ is formed in the substrate holder 18 as shown in FIG. 5. An inner circumferential side of the holder-side internal space $R_1$ is sealed by the substrate-side sealing member 66, and an outer circumferential side of the holder-side internal space $R_1$ is sealed by the holder-side sealing member 68. This holder-side internal space $R_1$ communicates with a substrate-side internal space $R_2$ which is formed between the substrate holder 18 and the substrate W, so that a hermetic internal space R is formed by the holder-side internal space $R_1$ and the substrate-side internal space $R_2$ which are in communication with each other.

The first holding member 54 has a protruding portion 82 in a ring shape corresponding to a size of the substrate W. The protruding portion 82 has a support surface 80 which contacts the peripheral portion of the substrate W to support the substrate W. The protruding portion 82 has recesses 84 arranged at predetermined positions along a circumferential direction of the protruding portion 82.

Figure 3:
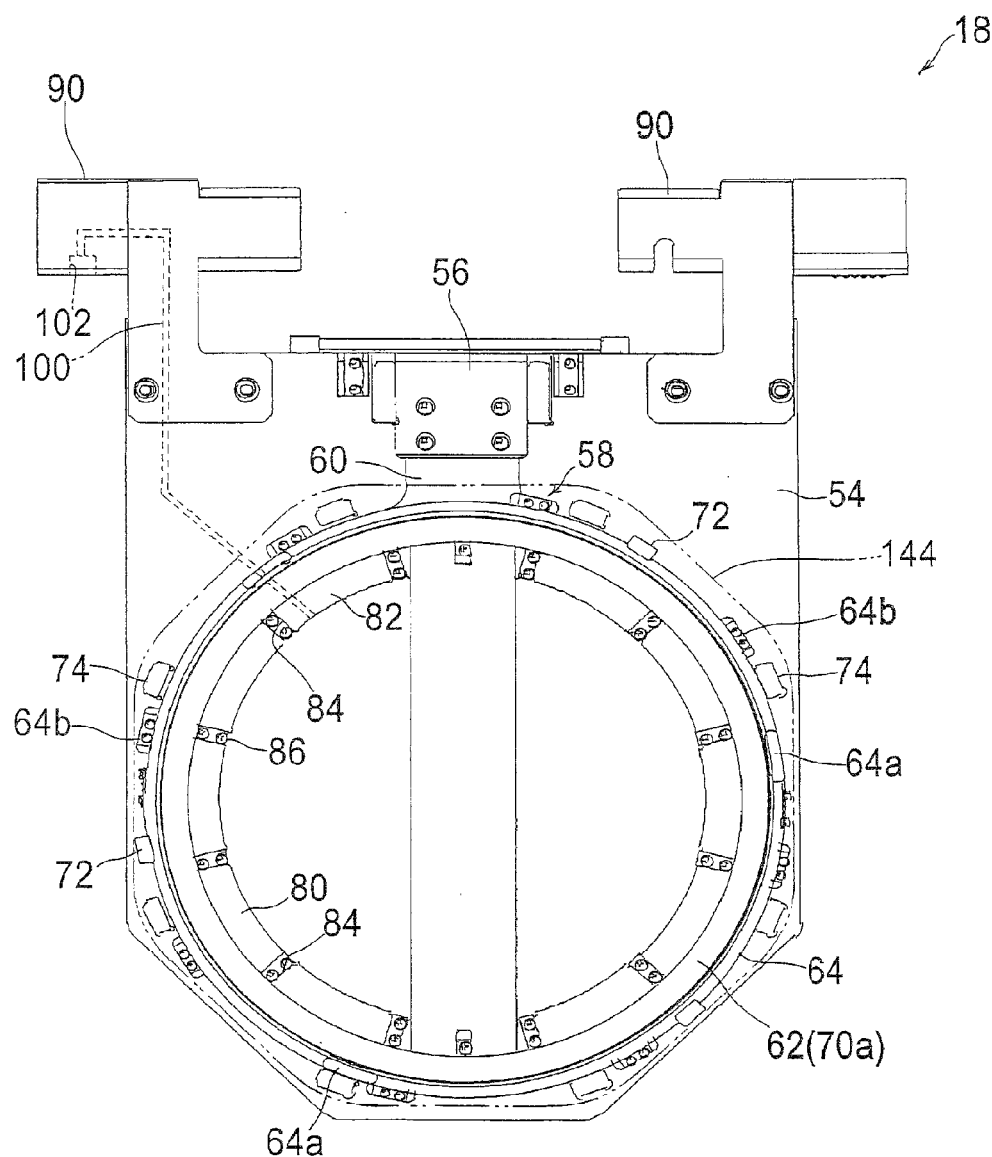
FIG. 3 is a plan view of the substrate holder shown in FIG. 2.
Figure 4:
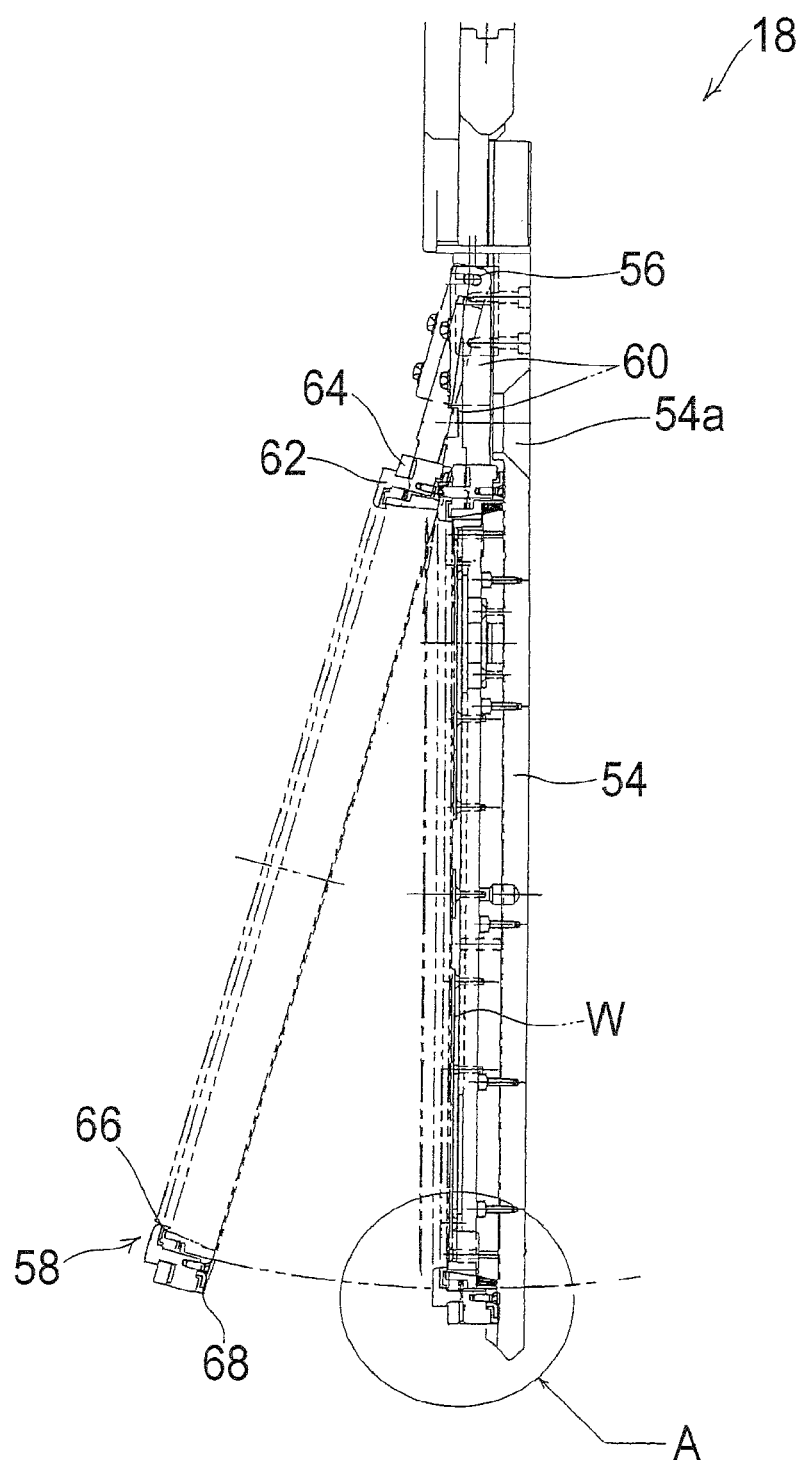
FIG. 4 is a right side view of the substrate holder shown in FIG. 2.

As shown in FIG. 3, a plurality of electrical conductors (electrical contacts) 86 (e.g., 12 conductors as illustrated), coupled respectively to wires extending from external contacts provided on a hand 90, are disposed in the recesses 84 of the protruding portion 82. When the substrate W is placed on the support surface 80 of the first holding member 54, ends of the electrical conductors 86 are exposed in a springy state on the surface of the first holding member 54 at positions beside the substrate W to contact lower portions of the electrical contacts 88 shown in FIG. 5.

The electrical contacts 88, to be electrically coupled to the electrical conductors 86, are secured to the seal holder 62 of the second holding member 58 by fastening tools 89, such as bolts. The electrical contacts 88 each have a leaf spring-like contact portion lying outside the substrate-side sealing member 66 and projecting inwardly. This contact portion is springy and bends easily. When the substrate W is held by the first holding member 54 and the second holding member 58, the contact portions of the electrical contacts 88 make elastic contact with the peripheral surface of the substrate W supported on the support surface 80 of the first holding member 54.

The second holding member 58 is opened and closed by a not-shown pneumatic cylinder and by the weight of the second holding member 58 itself. More specifically, a through-hole 54a is formed in the first holding member 54, and the pneumatic cylinder is provided so as to face the through-hole 54a when the substrate holder 18 is placed on the substrate loading unit 20. The second holding member 58 is opened by extending a piston rod of the pneumatic cylinder to lift up a pressing rod (not shown) through the through-hole 54a to thereby push up the seal holder 62 of the second holding member 58. The second holding member 58 is closed by its own weight when the piston rod is retracted.

A pair of approximately T-shaped hands 90 is coupled to the ends of the first holding member 54 of the substrate holder 18. These hands 90 serve as a support when the substrate holder 18 is transported and when the substrate holder 18 is held in a suspended state. In the stock unit 24, outwardly projecting portions of the hands 90 are placed on an upper surface of a peripheral wall of the stock unit 24, whereby the substrate holder 18 is suspended in a vertical position. When transporting the substrate holder 18 from the stock unit 24, the hands 90 of the suspended substrate holder 18 are gripped by the transporter 42 or 44 of the substrate holder transport device 40. Also in the pre-wetting bath 26, the pre-soaking bath 28, the water-cleaning bath 30a, the second water-cleaning bath 30b, the blow bath 32, and the plating bath 34, the substrate holder 18 is held in a suspended state with the hands 90 placed on top of peripheral wall of the bath.

Figure 2:
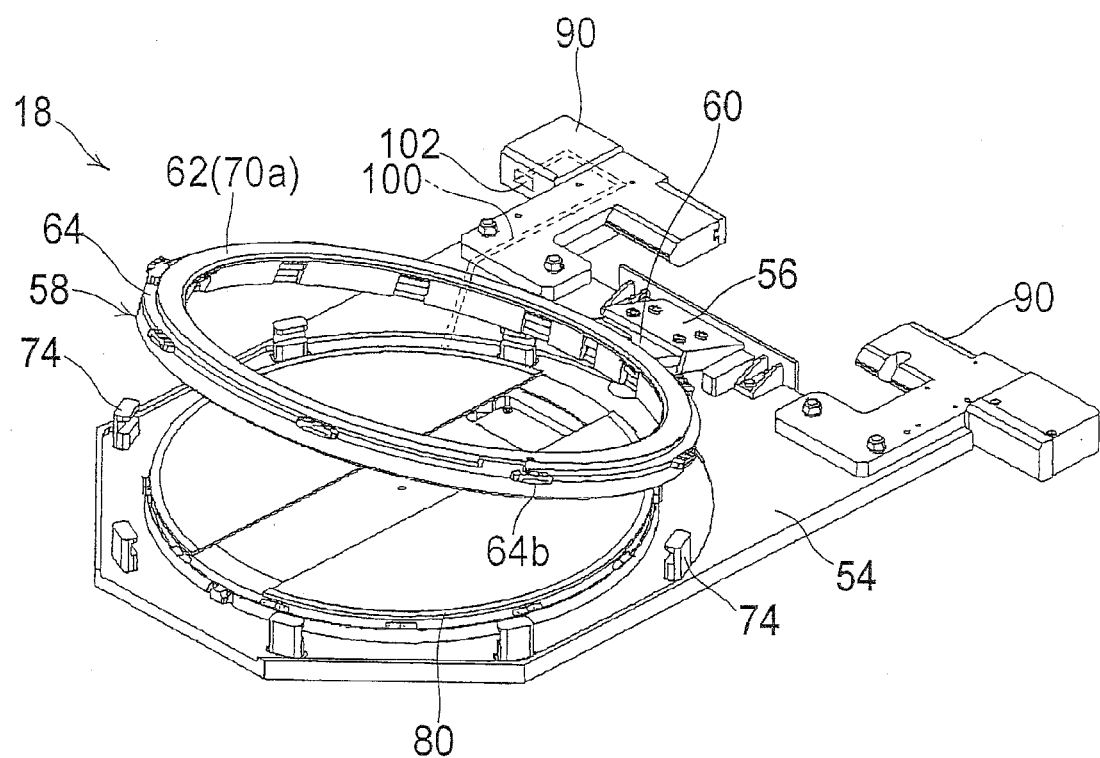
FIG. 2 is a schematic perspective view of a substrate holder.
Figure 6:
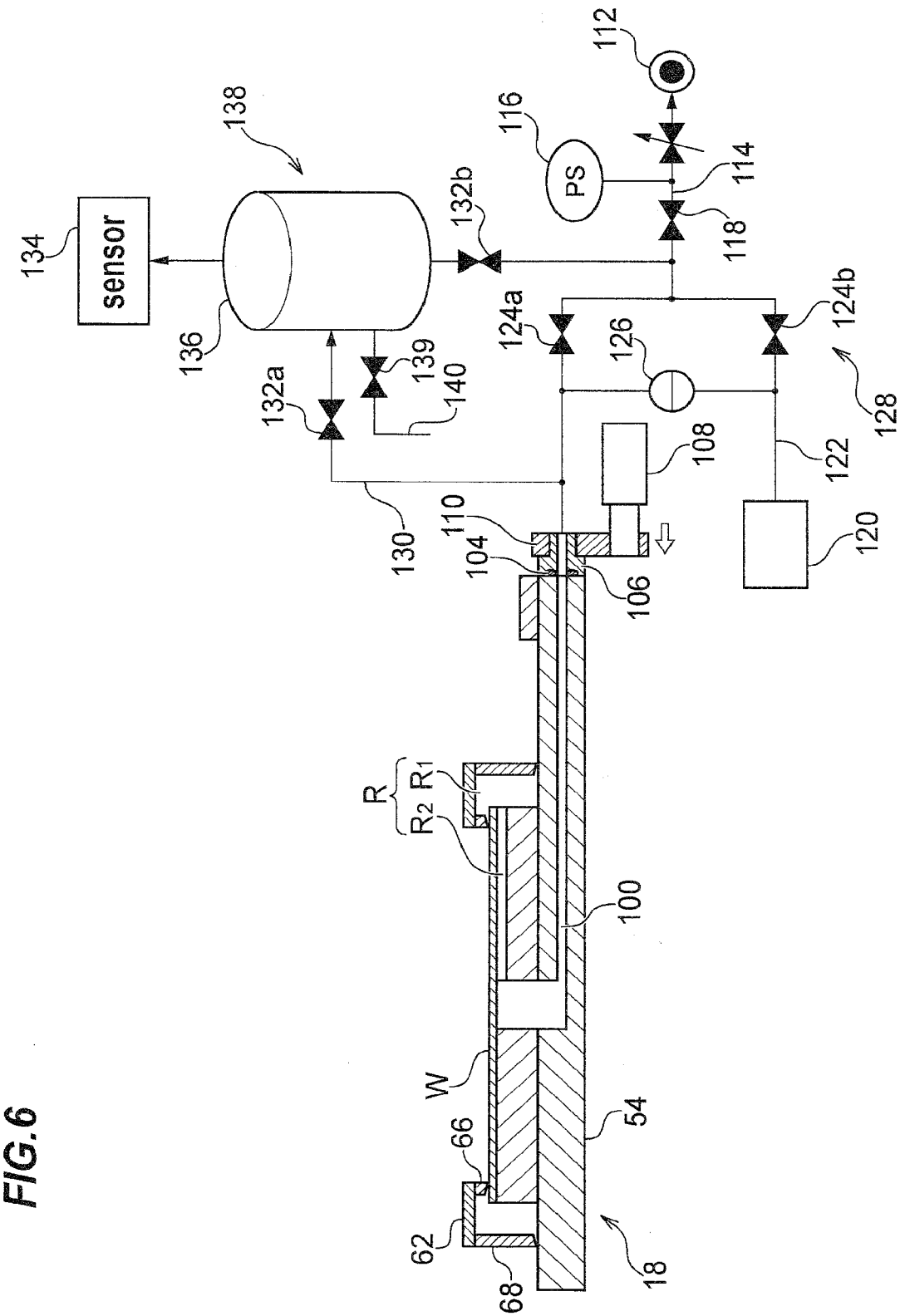
FIG. 6 is a diagram illustrating a first-stage leakage test and a second-stage leakage test for the substrate holder holding a substrate.

As schematically shown in FIG. 6, an internal passage 100 is formed in the first holding member 54 so as to communicate with the internal space R through the substrate-side internal space $R_2$, which is formed between the substrate holder 18 and the substrate W when the substrate W is held by the substrate holder 18. The internal space R is formed between the substrate holder 18 and the substrate W and sealed (hermetically enclosed) by the sealing members 66 and 68. As shown in FIGS. 2 and 3, the internal passage 100 is coupled to a suction port 102 provided in the hand 90.

As schematically shown in FIG. 6, the substrate loading unit 20 is provided with a suction coupling 106 having a seal ring 104. This suction coupling 106 is coupled to the suction port 102 of the hand 90 through the seal ring 104 which establishes a hermetically sealed state. The suction coupling 106 is coupled via a coupling plate 110 to an actuator 108, such as an air cylinder, which is disposed in a predetermined position on the substrate loading unit 20. When performing a leakage test of the substrate holder 18 holding the substrate W, the actuator 108 is driven to connect the suction coupling 106 to the suction port 102 of the hand 90. When the leakage is not performed, the suction coupling 106 is disconnected from the suction port 102.

The suction coupling 106 is coupled to a suction line 114 extending from a vacuum source 112, such as a vacuum pump. The suction line 114 is provided with a main on-off valve 118 and a pressure sensor 116 for measuring pressure in the suction line 114.

The plating apparatus further includes a master container 120 which is assured that any leakage does not occur. A differential pressure test line 122 extends from the master container 120 to the suction line 114 at a junction upstream of the main on-off valve 118. The suction line 114 and the differential pressure test line 122 are provided with an on-off valve 124a and an on-off valve 124b, respectively, which are located upstream of the junction where the suction line 114 and the differential pressure test line 122 join. A differential pressure sensor 126 is provided upstream of the on-off valves 124a and 124b for measuring differential pressure between pressure in the internal space R and pressure in the master container 120 when the on-off valves 124a and 124b are closed. These configurations constitute a pressure change detection section 128 which detects a change in the pressure in the internal space R after producing a vacuum in the internal space R through the suction line 114 and then closing off the internal space R.

The change in the pressure in the internal space R is detected by using the differential pressure sensor 126 which measures the differential pressure between the pressure in the internal space R and the pressure in the master container 120 when the on-off valves 124a and 124b are closed. This makes it possible to more accurately detect a very small change in the pressure in the internal space R as compared to the case where a change in the pressure in the internal space R is directly detected using a pressure sensor.

There is provided a bypass line 130 which branches off from the suction line 114 at a point upstream of the on-off valve 124a and joins the suction line 114 at a point between the on-off valve 124a and the main on-off valve 118. The bypass line 130 is provided with on-off valves 132a and 132b and a tracer gas tester 138 located between the on-off valves 132a and 132b. The tracer gas tester 138 includes a tester body 136 provided with a tracer gas sensor 134. An atmospheric air measuring hose 140 having an on-off valve 139 is coupled to the tester body 136. The tracer gas sensor 134 of the tracer gas tester 138 detects whether or not air (gas), flowing through the bypass line 130, contains a tracer gas.

Figure 7:
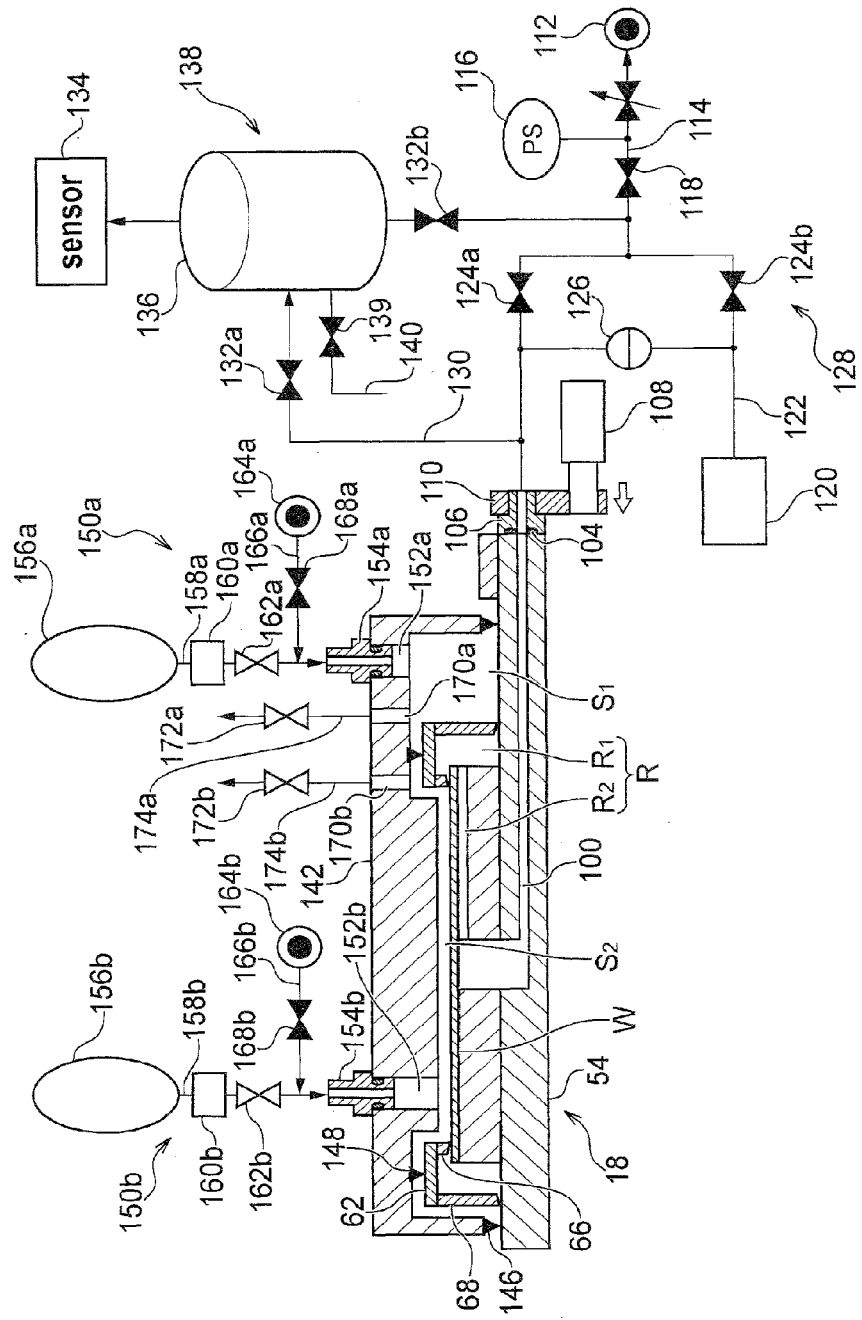
FIG. 7 is a diagram illustrating a third-stage leakage test for the substrate holder holding the substrate.

As shown in FIG. 7, a cylindrical seal case 142 with a closed top and an open bottom, which is movable vertically and horizontally, is disposed on the substrate loading unit 20. An annular tracer gas sealing member 146 and an annular partition sealing member 148 are mounted to a lower surface of the seal case 142. When the seal case 142 is lowered, the tracer gas sealing member 146 is brought into pressure contact with the surface of the first holding member 54 of the substrate holder 18 along a sealing line 144 as indicated by two-dot chain line shown in FIG. 3 to seal (i.e., hermetically close) a gap between the seal case 142 and the first holding member 54. When the seal case 142 is lowered, the partition sealing member 148 is also brought into pressure contact with the seal holder 62 of the second holding member 58 to seal (i.e., hermetically close) a gap between the seal case 142 and the seal holder 62.

The seal case 142 is moved from a retreated position to a position just above the substrate holder 18, and then lowered to bring the tracer gas sealing member 146 and the partition sealing member 148 into pressure contact with the surface of the first holding member 54 and the surface of the seal holder 62 of the second holding member 58, respectively, thereby forming two hermetic spaces $S_1$ and $S_2$ between the substrate holder 18 and the seal case 142. The space $S_1$ is a holder-side hermetic space that houses therein the holder-side sealing member 68 for sealing the gap between the first holding member 54 and the second holding member 58, and the space $S_2$ is a substrate-side hermetic space that houses therein the substrate-side sealing member 66 which is pressed against the peripheral portion of the substrate W to seal the gap between the substrate W and the second holding member 58.

The plating apparatus of this embodiment further includes tracer gas introduction devices 150a and 150b for introducing a tracer gas into the holder-side hermetic space $S_1$ and the substrate-side hermetic space $S_2$, respectively. The tracer gas introduction device 150a for introducing the tracer gas into the holder-side hermetic space $S_1$ has a gas supply line 158a connecting a tracer gas tank 156a to a gas coupling 154a mounted to a gas supply port 152a, which is formed in the seal case 142 and communicates with the holder-side hermetic space $S_1$. The gas supply line 158a is provided with a pressure control valve 160a and an on-off valve 162a which are arranged in this order along a gas flow direction.

An air supply line 166a, extending from an air supply source 164a, is coupled to the gas supply line 158a at a point downstream of the on-off valve 162a. This air supply line 166a is provided with an on-off valve 168a. A gas exhaust line 174a, provided with an on-off valve 172a, is coupled to a gas exhaust port 170a, which communicates with the holder-side hermetic space $S_1$ and is formed in the seal case 142.

The tracer gas is supplied into the holder-side hermetic space $S_1$ by opening the on-off valve 162a on the gas supply line 158a and the on-off valve 172a on the gas exhaust line 174a. When a predetermined amount of the tracer gas is supplied into the holder-side hermetic space $S_1$, the on-off valve 162a and the on-off valve 172a are both closed to seal the tracer gas in the holder-side hermetic space $S_1$. When the on-off valve 168a on the air supply line 166a and the on-off valve 172a on the gas exhaust line 174a are opened, air is introduced into the holder-side hermetic space $S_1$ to purge the tracer gas from the holder-side hermetic space $S_1$.

The tracer gas introduction device 150b for introducing the tracer gas into the substrate-side hermetic space $S_2$ has a similar construction to the tracer gas introduction device 150a for introducing the tracer gas into the holder-side hermetic space $S_1$. Therefore, the same reference numerals, but using a letter "b" instead of a letter "a", are used for the corresponding components, and a duplicate description thereof is omitted. The gas supply port 152b and the gas exhaust port 170b communicate with the substrate-side hermetic space $S_2$.

In this embodiment, helium gas is used as the tracer gas. The helium gas is lighter than air and exists in air only in an amount of 5 ppm and is therefore distinguishable from other gases. G-Fine helium gas leak tester, manufactured by Cosmo Instruments Co., Ltd., is used as the tracer gas tester 138. The tester 138 of this embodiment can detect leak of 0.0006 mL/min to 1000 mL/min of the helium gas (tracer gas), and can detect leak of 0.1 cc/min in 11 seconds.

A gas mixture of 5% hydrogen and 95% nitrogen may also be used as the tracer gas. This gas mixture is dilution hydrogen ($H_2+N_2$) which is safe, clean, and incombustible. This gas mixture is available at a lower price than helium gas, stably available as a multipurpose industrial gas, and easily diffuses. A background concentration of this gas mixture is as low as 0.5 ppm. It is also possible to use argon gas which is heavier than air (1.784 g/L, 1.38 times heavier than air). The argon gas is contained in the air at a concentration of 0.93 vol %.

A sequence of plating processes performed by the above-described plating apparatus will now be described. First, one substrate is removed from the cassette 10 mounted on the cassette table 12 by the substrate transport device 22. The substrate is placed on the aligner 14, which then aligns an orientation flat or a notch of the substrate in a predetermined direction. After the alignment, the substrate is transported to the substrate loading unit 20 by the substrate transport device 22.

Two substrate holders 18 stored in the stock unit 24 are simultaneously gripped by the first transporter 42 of the substrate holder transport device 40, and transported to the substrate loading unit 20. The substrate holders 18 are lowered in a horizontal position until the two substrate holders 18 are simultaneously placed on the stage plate 52 of the substrate loading unit 20. Two pneumatic cylinders are then actuated to open the second holding members 58 of the substrate holders 18, respectively.

In this state, the substrate is inserted into the center-side substrate holder 18 by the substrate transport device 22, and the pneumatic cylinder is reversely actuated to close the second holding member 58. The second holding member 58 is then locked by means of a locking and unlocking mechanism provided above the substrate loading unit 20. After completion of the loading of the substrate into the substrate holder 18, the stage plate 52 is slid laterally, and a substrate is then loaded into the other substrate holder 18 in the same manner. Thereafter, the stage plate 52 is returned to its original position.

The substrate W is secured to the substrate holder 18 with its front surface (to-be-plated surface) exposed in an opening of the substrate holder 18. The substrate-side sealing member 66 seals the gap between the peripheral portion of the substrate W and the second holding member 58 and the holder-side sealing member 68 seals the gap between the first holding member 54 and the second holding member 58 so as not to allow the plating solution to enter the internal space R. These sealing members 66 and 68 enable electrical connection between the electrical contacts 88 and a portion of the substrate W that does not contact the plating solution. The wires extending from the electrical contacts 88 are connected to the external contacts provided on the hand 90 of the substrate holder 18. Therefore, an electric current can be fed to a film (e.g., a seed layer) of the substrate W by establishing electrical connection between a power source and the external contacts on the hand 90.

Figure 8:
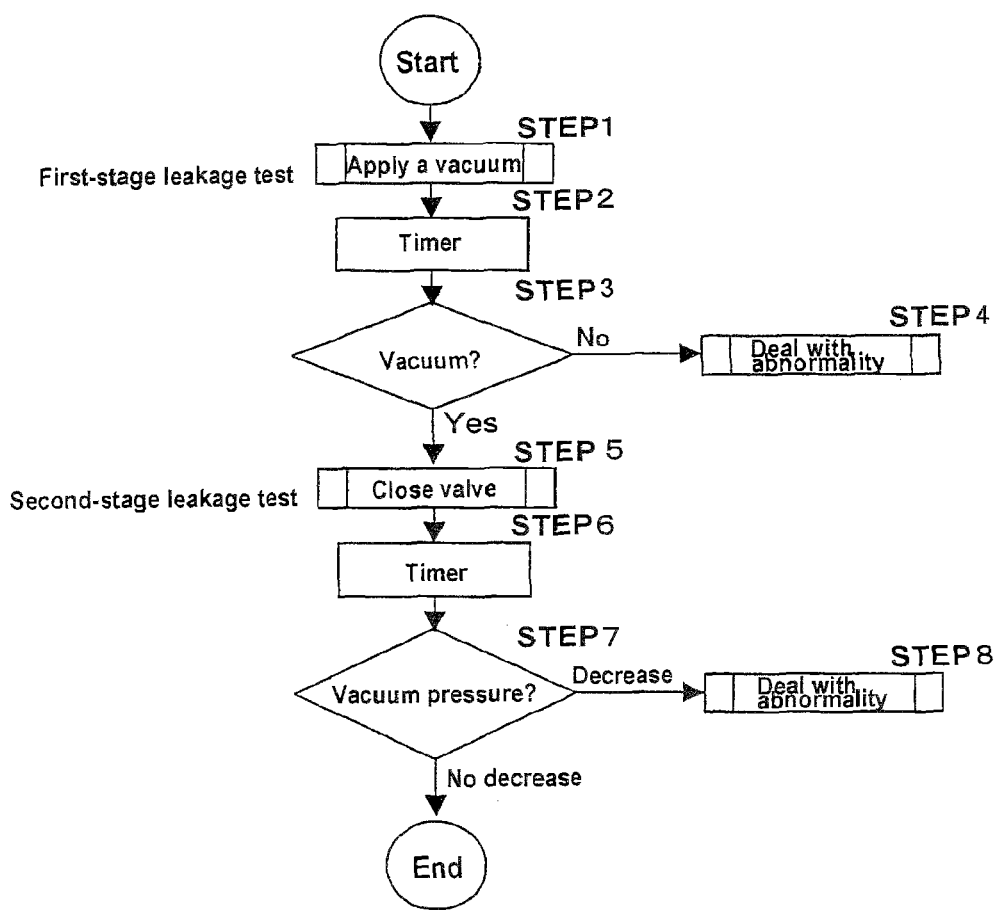
FIG. 8 is a flow chart showing an exemplary process flow of the first-stage leakage test and the second-stage leakage test.

Next, a pre-plating first-stage leakage test is performed in order to determine whether or not the gap between the peripheral portion of the substrate W and the second holding member 58 is sealed (i.e., hermetically closed) by the substrate-side sealing member 66 and whether or not the gap between the first holding member 54 and the second holding member 58 is sealed (i.e., hermetically closed) by the holder-side sealing members 68 in a manner to prevent intrusion of the plating solution. A process flow of the first-stage leakage test is shown in FIG. 8 (steps 1 to 4). As shown in FIG. 6, the suction coupling 106 is coupled to the suction port 102 of the hand 90 of the substrate holder 18, and only the main on-off valve 118 and the on-off valve 124a of the suction line 114 are opened to evacuate the internal space R (the holder-side internal space $R_1$ and the substrate-side internal space $R_2$) (step 1). The evacuation is performed for a certain period of time (e.g., two seconds), which is measured by a timer (step 2). After the certain period of time has elapsed, it is determined whether or not the pressure in the internal space R has reached a predetermined vacuum pressure (step 3). The pressure in the internal space R is measured by the pressure sensor 116.

If the pressure in the internal space R has not reached the predetermined vacuum pressure within the certain period of time, it is determined that leakage of the plating solution can occur (i.e., the substrate holder 18 has failed in the first-stage leakage test) due to an abnormality caused by an apparent operational error, inadequate maintenance, or the like. Examples of such an abnormality are that the substrate W is not held by the substrate holder 18, the sealing members 66 and 68 are not mounted to the substrate holder 18, the sealing members 66 and 68 are not mounted to the seal holder 62 properly, and there is a serious failure of the sealing members 66 and 68. Appropriate measures are then taken to deal with the abnormality (step 4). For example, if the substrate W is not held by the substrate holder 18, it is likely that a failure has occurred in the plating apparatus. In this case, the plating apparatus is stopped and checked. In a case where the substrate W is held by the substrate holder 18, the substrate holder 18 is recovered and checked.

In this manner, the first-stage leakage test can quickly and securely detect the occurrence of leakage of the plating solution due to the apparent operational error or inadequate maintenance or the like, and can reduce a burden on the below-described second-stage leakage test.

If the pressure in the internal space R has reached the predetermined vacuum pressure within the certain period of time, i.e., the substrate holder 18 has passed the first-stage leakage test, a second-stage leakage test of the substrate holder 18 is performed. Process flow of the second-stage leakage test is also shown in FIG. 8 (steps 5 to 8). While the suction coupling 106 is coupled to the suction port 102 of the hand 90 of the substrate holder 18, only the main on-off valve 118 and the on-off valve 124a of the suction line 114 and the on-off valve 124b of the differential pressure test line 122 are opened to produce a vacuum simultaneously in the internal space R and the master container 120 so that the internal space R and the interior of the master container 120 have the same vacuum pressure therein. Thereafter, the main on-off valve 118 and the on-off valve 124a of the suction line 114 and the on-off valve 124b of the differential pressure test line 122 are closed (step 5) and left for a certain period of time (e.g., 5 seconds). This period of time is measured by a timer (step 6). During the certain period of time, a so-called build-up test is performed by measuring the difference between the pressure in the internal space R and the pressure in the master container 120 by means of the differential pressure sensor 126 so as to detect whether or not the pressure difference becomes equal to or larger than a predetermined value (as a result of a decrease in the degree of vacuum in the internal space R) (step 7). The use of the build-up test method can more accurately detect a very small change in the pressure in the internal space R as compared to a case where a change in the pressure in the internal space R is directly detected by using a pressure sensor.

Although in this embodiment the change in the pressure in the internal space R is measure by means of the pressure change detection section 128 according to the differential pressure method using the differential pressure sensor 126, it is possible to use the pressure sensor 116 as a pressure change detection section, i.e., to directly measure the change in the pressure in the internal space R without separately providing the pressure change detection section 128.

If the difference between the pressure in the internal space R and the pressure in the master container 120 becomes equal to or larger than the predetermined value, then the sealed state provided by the sealing members 66 and 68 is determined to be imperfect (i.e., the substrate holder 18 has failed in the second-stage leakage test). The reasons for imperfect sealing of the sealing members 66 and 68 include the followings.

(1) The substrate W was not held in a proper position on the substrate holder 18.

(2) There was an abnormality in a resist (which coats a substrate surface in order to mask portions not to be plated), such as the presence of surface irregularities on the resist, the existence of cutout portion in the resist just under the sealing member, too small diameter of the resist, and non-concentric resist formation with the substrate.

(3) There was damage to the sealing members 66 and 68, such as a scratch in the sealing surface(s) of the sealing members 66 and 68, a loss of the elasticity of the sealing members 66 and 68 due to the plating solution.

(4) A resist that has peeled off a preceding substrate has adhered to the substrate-side sealing member 66 of the substrate W.

The following measures can be taken for the substrate holder 18 that has failed in the second-stage leakage test (step 8).

(1) The substrate W is removed from the substrate holder 18 once, the substrate W is rotated (e.g., through 180 degrees) so as to change a manner of contact between the resist on the substrate surface and the substrate-side sealing member 66, and then the substrate W is held again by the substrate holder 18.

(2) The substrate W is removed from the substrate holder 18, and the substrate is replaced with the next substrate. Conditions of the resist on the substrate W that has been removed from the substrate holder 18 are checked.

(3) The substrate holder 18 is replaced with a new one, and the old one is checked. It is desirable to store a spare substrate holder(s) in the plating apparatus, or to design the plating apparatus to be capable of carrying in and out a substrate holder even during operation.

Subsequent to the second-stage leakage test, the substrate holder 18 can be subjected to a third-stage leakage test.

First, as shown in FIG. 7, the seal case 142 is moved from the retreated position to a position just above the substrate holder 18 holding the substrate W, and then lowered to bring the tracer gas sealing member 146 into slight contact with the first holding member 54 at a position along the sealing line 144 and simultaneously bring the partition sealing member 148 into slight contact with the surface of the seal holder 62 of the second holding member 58, thereby forming the holder-side hermetic space $S_1$ and the substrate-side hermetic space $S_2$ between the substrate holder 18 and the seal case 142. These hermetic spaces $S_1$ and $S_2$ are hermetically sealed (enclosed) by the tracer gas sealing member 146 and the partition sealing member 148.

The third-stage leakage test is performed just below the locking and unlocking mechanism. Thus, when the test is not conducted, the seal case 142 is in the retreated position which is located away from the position below the locking and unlocking mechanism. When the test is conducted, the seal case 142 is inserted into a space between the substrate holder 18 and the locking and unlocking mechanism. This movement of the seal case 142 is performed by means of a seal case movement mechanism (not shown).

In this state, the third-stage leakage test is performed on the holder-side hermetic space $S_1$. Specifically, the tracer gas, such as helium gas, is supplied into the holder-side hermetic space $S_1$ by opening only the on-off valve 162a of the gas supply line 158a of the tracer gas introduction device 150a and the on-off valve 172a of the gas exhaust line 174a. When the predetermined amount of the tracer gas is supplied into the holder-side hermetic space $S_1$, the on-off valve 162a and the on-off valve 172a are both closed to seal the tracer gas in the holder-side hermetic space $S_1$. In this state, the suction coupling 106 is coupled to the suction port 102 of the hand 90 of the substrate holder 18 in the same manner as described above, and only the on-off valves 132a and 132b of the bypass line 130 and the main on-off valve 118 of the suction line 114 are opened, so that the air (gas) is evacuated from the internal space R. The air (gas), evacuated from the internal space R, is collected in the tester body 136 of the tracer gas tester 138.

Whether or not the air (gas) collected in the tester body 136 contains the tracer gas, which is helium gas in this embodiment, is then detected by means of the tracer gas sensor 134. The helium gas is present in nature only at a concentration of 5 ppm. Therefore, there is a difference in the concentration of the helium gas between the air (gas) containing the helium gas and natural air. Based on this difference in the helium-gas concentration, it is possible to detect whether or not the collected air (gas) contains the helium gas therein. If the air (gas) collected in the tester body 136 contains the tracer gas (helium gas), then it is determined that the sealed state provided by the holder-side sealing member 68, which is located in the holder-side hermetic space $S_1$ and mounted to the second holding member 58 of the substrate holder 18, is imperfect and that there is leakage between the holder-side sealing member 68 and the first holding member 54 (the substrate holder 18 has failed in the third-stage leakage test).

By utilizing the tracer gas leakage in this manner, even a trace amount of the leakage of the plating solution between the holder-side sealing member 68 and the first holding member 54 can be securely detected (predicted) prior to the plating process. This holds true for the below-described case where even a trace amount of plating solution leaks through the gap between the substrate-side sealing member 66 and the surface of the substrate W.

Next, the tracer gas (the helium gas) is supplied into and sealed in the substrate-side hermetic space $S_2$ in a manner similar to the above-described manner of supplying the tracer gas into the holder-side hermetic space $S_1$. Thereafter, air (gas) is evacuated from the internal space R. The air (gas), evacuated from the internal space R, is collected in the tester body 136 of the tracer gas tester 138. Whether or not the air (gas) collected in the tester body 136 contains the tracer gas (the helium gas) is then detected by means of the tracer gas sensor 134. If the air (gas) collected in the tester body 136 contains the tracer gas (the helium gas), then it is determined that the sealed state provided by the substrate-side sealing member 66, which is located in the substrate-side hermetic space $S_2$ and mounted to the second holding member 58 of the substrate holder 18, is imperfect and that there is leakage between the substrate-side sealing member 66 and the surface of the substrate W (the substrate holder 18 has failed in the third-stage leakage test).

When it is determined that there is leakage between the holder-side sealing member 68 and the first holding member 54 or between the substrate-side sealing member 66 and the surface of the substrate W, measures are taken for the substrate holder 18 in the same manner as the above-described measures to be taken when the substrate holder 18 has failed in the second-stage leakage test. Because the third-stage leakage test are performed individually for the holder-side hermetic space $S_1$ and the substrate-side hermetic space $S_2$, it is possible to determine whether the substrate-side sealing member 66 or the holder-side sealing member 68 is likely to cause the leakage of the plating solution and to take appropriate measures for that sealing member.

According to this embodiment, the leakage of the plating solution due to an apparent operational error or inadequate maintenance can be detected early and quickly by the first-stage leakage test which can be done in a relatively short time. Moreover, the first-stage leakage test can reduce the burden on the second-stage leakage test. The second-stage leakage test can securely and quickly detect serious sealing failure of the sealing members 66 and 68 of the substrate holder 18, making it possible to take appropriate actions on the possible leakage of the plating solution. The third-stage leakage test, which requires a relatively long time and which is optionally carried out for the substrate holder 18 that has passed the second-stage leakage test, can securely detect leakage of even a trace amount of plating solution.

The third-stage leakage test may not be conducted every time the substrate W is held by the substrate holder 18, because the state of the substrate or the sealing members 66 and 68 rarely changes drastically. Further, generally it takes a long time to conduct the third-stage leakage test. Accordingly, conducting the third-stage leakage test frequently leads to a considerable decrease in the throughput. In view of this, the third-stage leakage test, which checks the state of the substrate holder, may be performed separately from the first-stage leakage test and the second-stage leakage test as an off-line test which does not affect the productivity. Such an off-line test may be performed periodically or before or after the operation of the apparatus. In the off-line leakage test (i.e., the third-stage leakage test), in order to eliminate the influence of the resist on the substrate surface so as to check the state of the substrate holder accurately, it is preferred to use a dummy substrate (a substrate having no resist formed thereon), i.e., to perform the leakage test on the substrate holder holding a dummy substrate. Use of such a dummy substrate in the leakage test can avoid a decrease in the throughput. The dummy substrate may be supplied to the substrate holder 18 from the cassette 10 set on the cassette table 12 or a dummy substrate cassette provided in the apparatus.

Although in this embodiment the third-stage leakage test is performed for both of the holder-side hermetic space $S_1$ and the substrate-side hermetic space $S_2$, the third-stage leakage test may be performed only on one of the holder-side hermetic space $S_1$ and the substrate-side hermetic space $S_2$. For example, based on the results of the third-stage leakage test for the holder-side hermetic space $S_1$, the third-stage leakage test for the substrate-side hermetic space $S_2$ may be omitted. More specifically, if it is determined, based on the results of the third-stage leakage test for the holder-side hermetic space $S_1$, that the sealed state provided by the holder-side sealing member 68 is imperfect and that there is leakage between the holder-side sealing member 68 and the first holding member 54 (i.e., the substrate holder 18 has failed in the third-stage leakage test), then the third-stage leakage test for the substrate-side hermetic space $S_2$ may be omitted.

Plating is performed on a substrate held by the substrate holder 18 that has passed the pre-plating leakage test. The substrate holder 18 that has failed in the pre-plating leakage test is opened, and a substrate is removed from that substrate holder 18 and returned to the cassette 10 on the cassette table 12. The failed substrate holder 18 is gripped by the first transporter 42 of the substrate holder transport device 40 and returned to the stock unit 24 as an unusable holder. The failed substrate holder 18 may be removed from the stock unit 24 after the operation of the plating apparatus, and may be subjected to appropriate remedy.

According to the above-discussed embodiment, it is possible to detect whether or not the gap between the peripheral portion of the substrate W and the second holding member 58 is properly sealed by the substrate-side sealing member 66 and whether or not the gap between the first holding member 54 and the second holding member 58 is properly sealed by the holder-side sealing members 68. A sequence of plating processes, including the pre-plating leakage test for all the substrate holders 18, can be performed systematically in a successive manner.

The substrate holder 18 may have a sensor for sensing contact state between the substrate and the electrical contacts 88 and detecting whether the contact state is poor or not simultaneously or before or after the pre-plating leakage test. If the contact state is determined to be poor, the same measures as those for the substrate holder that has failed in the pre-plating leakage test can be taken for the substrate holder 18 with the poor contact state.

The substrate, held by the substrate holder 18 that has passed the pre-plating leakage test, is subjected to the following plating process.

The substrate holder 18, which holds the substrate and has passed the pre-plating leakage test, is gripped by the first transporter 42 of the substrate holder transport device 40 and transported to the pre-wetting bath 26, where the substrate holder 18 is lowered until the substrate, together with the substrate holder 18, is immersed in a pre-wetting liquid in the pre-wetting bath 26. As described above, the substrate holder 18 that has failed in the pre-plating leakage test and has been returned to the stock unit 24 is not allowed to be used and is not transported to the pre-wetting bath 26.

The substrate holder 18, which holds the substrate and has passed the pre-plating leakage test, may be transported to the stock unit 24 once and stored temporarily in a vertically suspended state in the stock unit 24, and then may be transported to the pre-wetting bath 26.

Although not shown, instead of providing the substrate loading unit 20 on which two substrate holders 18 are placed horizontally, it is possible to provide a fixing station which is configured to receive two substrate holders from the first transporter 42 and support the two substrate holders vertically (or in an inclined state with a small angle with respect to the vertical direction). The substrate holders can be brought into a horizontal position by rotating the fixing station, holding the substrate holders in the vertical position, by 90 degrees.

Although in this embodiment the one locking and unlocking mechanism is provided, it is possible to provide two locking and unlocking mechanisms adjacent to each other and to simultaneously perform locking and unlocking of two substrate holders by the two locking and unlocking mechanisms.

Next, the two substrate holders 18 loaded with the substrates are transported to the pre-soaking bath 28 in the same manner as described above. In the pre-soaking bath 28, an oxide film on each substrate is etched away, so that a clean metal surface is exposed. Thereafter, the substrate holders 18 loaded with the substrates are transported to the first water-cleaning bath 30a in the same manner as described above, and the surface of each substrate is cleaned with the pure water stored in the first water-cleaning bath 30a.

After water cleaning, the two substrate holders 18 loaded with the substrates are gripped by the second transporter 44 of the substrate holder transport device 40 and are transported to the plating bath 34 which is filled with the plating solution. Each substrate holder 18 is suspended and held at a predetermined position in one of the plating cells 38. The second transporter 44 of the substrate holder transport device 40 sequentially repeats the above operations to sequentially transport the substrate holders 18 to the plating cells 38 of the plating bath 34 and suspend the substrate holders 18 in the plating cells 38.

After suspending the substrate holders 18 in all the plating units 38 is completed, plating of the surface of each substrate is performed in the following manner. A plating voltage is applied between each substrate W and an anode (not shown) in the plating cell 38, while the paddle is reciprocated parallel to the surface of the substrate by the paddle drive device 46. During plating of the substrate, the substrate holder 18 is suspended from the top of the plating cell 38 through the hands 90, so that electricity is fed from a plating power source to a film (e.g., a seed layer) of the substrate through the electrical conductors 86 and the electrical contacts 88. The plating solution circulates from the overflow bath 36 to the plating cell 38 through a circulation line (not shown) basically at all times during operations of the plating apparatus. The plating solution is maintained at a constant temperature by a constant-temperature device provided in the circulation line.

After the completion of plating, the application of the plating voltage and the reciprocation of the paddle are stopped. Thereafter, the two substrate holders 18 loaded with the plated substrates W are simultaneously gripped by the second transporter 44 of the substrate holder transport device 40, and are transported to the second water-cleaning bath 30b in the same manner as described above, so that the surface of each substrate is cleaned with the pure water stored in the second water-cleaning bath 30b.

After cleaning, the substrate holders 18 loaded with the substrates W are transported to the blow bath 32, where air or N₂ gas blows toward the substrates W held by the substrate holders 18 to remove water droplets therefrom to thereby dry the substrates W.

The second transporter 44 of the substrate holder transport device 40 sequentially repeats the above operations to successively transfer the substrate holders 18, each loaded with the plated substrate, to the blow bath 32.

The substrate holders 18, each loaded with the plated substrate W after being dried in the blow bath 32, are gripped by the first transporter 42 of the substrate holder transport device 40 and are placed on the stage plate 52 of the substrate loading unit 20.

The second holding member 58 of the center-side substrate holder 18 is firstly unlocked by the locking and unlocking mechanism, and the pneumatic cylinder is actuated to open the second holding member 58. It is preferable to provide a spring element (not shown), other than the electrical contacts 88, on the second holding member 58 so as to prevent the substrate W from sticking to the second holding member 58 when it opens. Thereafter, the plated substrate W is removed from the substrate holder 18 by the substrate transport device 22 and transported to the spin rinse drier 16, where the substrate W is cleaned with pure water and then spin-dried (drained) by high-speed rotation of the substrate W. The dried substrate W is returned to the cassette 10 by the substrate transport device 22.

After or simultaneously with returning the substrate to the cassette 10, the stage plate 52 is slid laterally and the other substrate is removed from the other substrate holder 18. The substrate is then spin-rinse-dried by the spin rinse drier 16, and the dried substrate is returned to the cassette 10 in the same manner.

A new substrate W is loaded into the substrate holder 18 from which the plated substrate has been removed, and the new substrate W is subjected to the sequential processes. When there is no new substrate W to be processed, the substrate holder 18 with no substrate is gripped by the first transporter 42 of the substrate holder transport device 40 and returned to a predetermined place in the stock unit 24.

In this manner, all the substrates are removed from the substrate holders 18, spin-dried by the spin rinse drier 16, and returned to the cassette 10. The sequence of operations is completed when all the substrates have been plated, cleaned, and dried and all the substrate holders 18 are returned to predetermined places in the stock unit 24.

Figure 9:
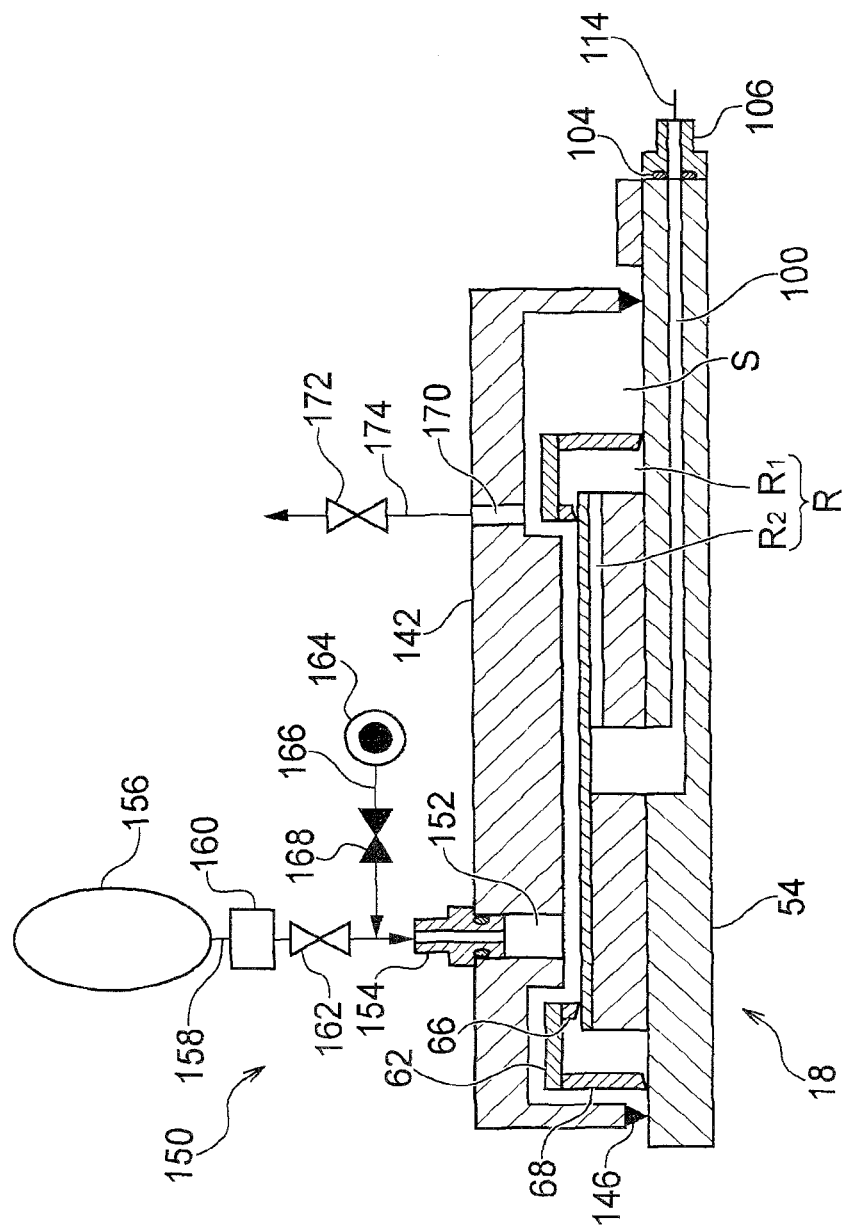
FIG. 9 is a diagram schematically showing a main part of the plating apparatus according to another embodiment of the present invention.

FIG. 9 is a diagram schematically showing a main part of the plating apparatus according to another embodiment of the present invention. The plating apparatus of this embodiment differs from the above-described plating apparatus in use of the seal case 142 not having the partition sealing member 148 (see FIG. 7). Thus, when the tracer gas sealing member 146 of the seal case 142 is brought into pressure contact with the surface of the first holding member 54 of the substrate holder 18 along the sealing line 144 (see FIG. 3), a hermetic space S is formed between the seal case 142 and the substrate holder 18. The holder-side sealing member 68 and the substrate-side sealing member 66 are located in this hermetic space S. The plating apparatus of this embodiment is provided with a single tracer gas introduction device 150 for introducing the tracer gas into the hermetic space S.

This tracer gas introduction device 150 for introducing the tracer gas into the hermetic space S has a similar construction to the above-described tracer gas introduction device 150a for introducing the tracer gas into the holder-side hermetic space S₁. Therefore, the same reference numerals, but not using the letter "a", are used for the equivalent components, and a duplicate description thereof will be omitted. The gas supply port 152 and the gas exhaust port 170 communicate with the hermetic space S.

In this embodiment, the third-stage leakage test is performed as follows. The tracer gas sealing member 146 of the seal case 142 is brought into slight contact with the first holding member 54 of the substrate holder 18 at a position along the sealing line 144 (see FIG. 3), thereby forming the hermetic space S between the substrate holder 18 and the seal case 142. This hermetic space S is hermetically sealed (enclosed) by the tracer gas sealing member 146. Thereafter, the tracer gas (the helium gas) is supplied into and sealed in the hermetic space S in the same manner as described above. The air (gas) is then evacuated from the internal space R, and the air (gas), evacuated from the internal space R, is collected in the tester body 136 of the tracer gas tester 138. Whether or not the air (gas) collected in the tester body 136 contains the tracer gas (the helium gas) is detected by the tracer gas sensor 134.

If the air (gas) collected in the tester body 136 contains the tracer gas (the helium gas), then it is determined that the sealed state provided by at least one of the substrate-side sealing member 66 and the holder-side sealing member 68, both mounted to the second holding member 58 of the substrate holder 18, is imperfect and that there is leakage between the holder-side sealing member 68 and the first holding member 54 and/or between the substrate-side sealing member 66 and the surface of the substrate W (the substrate holder 18 had failed in the third-stage leakage test).

The third-stage leakage test according to this embodiment cannot determine which one of the substrate-side sealing member 66 and the holder-side sealing member 68 can cause the leakage of the plating solution. However, the third-stage leakage test according to this embodiment has the advantage that the test of the substrate holder 18 can be completed in a shorter time.

While the present invention has been described with reference to preferred embodiments, it is understood that the present invention is not limited to the embodiments described above, but is capable of various changes and modifications within the scope of the inventive concept as expressed herein.

What is claimed is:

1. A method of plating a substrate while holding the substrate by a substrate holder having a first holding member and a second holding member which has an opening, said method comprising:
    holding the substrate with the substrate holder by supporting one surface of the substrate with the first holding member while placing the second holding member in contact with other surface of the substrate, with the other surface of the substrate exposed through the opening of the second holding member;
    sealing a gap between the first holding member and the second holding member by a first protruding portion of the second holding member while sealing a peripheral portion of the substrate by a second protruding portion of the second holding member when the substrate is held by the substrate holder, thereby forming an internal space in the substrate holder by the first holding member, the second holding member, and the substrate;
    covering with a seal case the other surface of the substrate exposed through the opening;
    sealing a gap between the first holding member and the seal case to form a hermetic space between the substrate holder and the seal case; and
    performing a leakage test by supplying a tracer gas into the hermetic space while evacuating air from the internal space and checking whether the air evacuated from the internal space contains the tracer gas.

2. The method according to claim 1, wherein:

sealing the gap between the first holding member and the seal case is performed while sealing a gap between the second holding member and the seal case to divide the hermetic space into a substrate-side hermetic space in which the second protruding portion is located and a holder-side hermetic space in which the first protruding portion is located; and the tracer gas is supplied into at least one of the substrate-side hermetic space and the holder-side hermetic space.

3. The method according to claim 1, wherein the leakage test is performed in a substrate loading unit for loading the substrate, to be plated, into the substrate holder.

4. An apparatus for plating a substrate, comprising:

a substrate holder including a first holding member and a second holding member which has an opening, the substrate holder being configured to hold a substrate by supporting one surface of the substrate with the first holding member while placing the second holding member in contact with other surface of the substrate, with the other surface of the substrate exposed through the opening of the second holding member, the second holding member having a first protruding portion configured to seal a gap between the first holding member and the second holding member and a second protruding portion configured to seal a peripheral portion of the substrate when the substrate is held by the substrate holder to form an internal space in the substrate holder by the first holding member, the second holding member, and the substrate, the substrate holder having an internal passage communicating with the internal space;

a suction coupling coupled to a suction line extending from a vacuum source and detachably mounted to the substrate holder so as to communicate with the internal passage;

a pressure sensor configured to check whether pressure in the internal space reaches a predetermined vacuum pressure within a certain period of time when producing a vacuum in the internal space through the suction line;

a pressure change detection section configured to detect a change in the pressure in the internal space after the vacuum is produced in the internal space and the internal space is closed off;

a seal case capable of covering the other surface of the substrate exposed through the opening of the second holding member;

a tracer gas sealing member configured to seal a gap between the first holding member and the seal case to form a hermetic space between the substrate holder and the seal case;

a tracer gas introduction device configured to introduce a tracer gas into the hermetic space; and a tracer gas tester configured to detect whether the tracer gas is contained in a gas flowing through the suction line.

5. The apparatus according to claim 4, wherein the pressure change detection section includes:

a master container which is assured that any leakage does not occur and is coupled to the vacuum source; and a differential pressure sensor configured to measure a differential pressure between the pressure in the master container and the pressure in the internal space.

6. The apparatus according to claim 4, further comprising:

a partition sealing member configured to seal a gap between the second holding member and the seal case to divide the hermetic space into a substrate-side hermetic space in which the second protruding portion is located and a holder-side hermetic space in which the first protruding portion is located.

7. The apparatus according to claim 6, wherein the tracer gas introduction device comprises a first tracer gas introduction device and a second tracer gas introduction device which are in fluid communication with the holder-side hermetic space and the substrate-side hermetic space, respectively, and the first tracer gas introduction device and the second tracer gas introduction device are configured to supply the tracer gas into the holder-side hermetic space and the substrate-side hermetic space independently.

* * * * *